(12) United States Patent
Diedrich (10) Patent No.: US 11,560,126 B2
(45) Date of Patent: Jan. 24, 2023

(54) METHOD FOR EMERGENCY RESPONSE TO A TRANSPORTATION VEHICLE TIRE PRESSURE LOSS AND TRANSPORTATION VEHICLE

(71) Applicant: VOLKSWAGEN AKTIENGESELLSCHAFT, Wolfsburg (DE)

(72) Inventor: Mathias Diedrich, Lehre (DE)

(73) Assignee: Volkswagen Aktiengesellschaft

( * ) Notice: Subject to any disclaimer, the term of this patent is extended or adjusted under 35 U.S.C. 154(b) by 122 days.

(21) Appl. No.: 16/577,726

(22) Filed: Sep. 20, 2019

(65) Prior Publication Data

US 2020/0094796 A1 Mar. 26, 2020

(30) Foreign Application Priority Data

Sep. 24, 2018 (DE) ...................... 10 2018 216 257.3

(51) Int. Cl.
| | | |
|---|---|---|
| *G06F 7/70* | (2006.01) | |
| *G06F 19/00* | (2018.01) | |
| *G06G 7/00* | (2006.01) | |
| *G06G 7/76* | (2006.01) | |
| *B60T 8/171* | (2006.01) | |
| *B60Q 9/00* | (2006.01) | |
| *B60T 7/12* | (2006.01) | |
| *B60T 8/24* | (2006.01) | |
| *G05D 1/00* | (2006.01) | |
| *B60C 23/02* | (2006.01) | |

(52) U.S. Cl.
CPC ............. *B60T 8/171* (2013.01); *B60Q 9/00* (2013.01); *B60T 7/12* (2013.01); *B60T 8/24* (2013.01); *G05D 1/0088* (2013.01); *B60C 23/02* (2013.01); *B60T 2210/00* (2013.01); *B60T 2240/02* (2013.01); *B60T 2240/03* (2013.01); *G05D 2201/0213* (2013.01)

(58) Field of Classification Search
CPC ... B60T 8/171; B60T 7/12; B60T 8/24; B60T 2210/00; B60T 2240/02; B60T 2240/03; B60Q 9/00; G05D 1/0088; G05D 2201/0213; B60C 23/02
USPC .......................................................... 701/70
See application file for complete search history.

(56) References Cited

U.S. PATENT DOCUMENTS

| | | |
|---|---|---|
| 2,155,903 A | 4/1939 | Leavenworth |
| 6,571,481 B1 | 6/2003 | Weiss |
| 7,379,800 B2 | 5/2008 | Breed |
| 9,156,349 B2 | 10/2015 | Guegan et al. |
| 10,053,069 B2 | 8/2018 | Wei et al. |
| 2008/0262784 A1* | 10/2008 | Massoni ............... B60C 23/06 73/146 |

(Continued)

FOREIGN PATENT DOCUMENTS

| | | |
|---|---|---|
| CN | 103587516 A | 2/2014 |
| CN | 108482365 A | 9/2018 |

(Continued)

*Primary Examiner* — Mahmoud S Ismail
(74) *Attorney, Agent, or Firm* — Barnes & Thornburg, LLP (57) ABSTRACT

A method for an emergency response in the event of a loss of tire pressure of a transportation vehicle including detecting a tire pressure at a wheel of the transportation vehicle and detecting an angle of inclination on an axle of the transportation vehicle associated with the wheel, A transportation vehicle for autonomous driving.

16 Claims, 3 Drawing Sheets

(56) References Cited

U.S. PATENT DOCUMENTS

| | | | |
|---|---|---|---|
| 2012/0095632 A1* | 4/2012 | Kimoto | B60W 30/18027 701/22 |
| 2014/0172241 A1* | 6/2014 | Shima | B60C 23/0488 701/49 |
| 2017/0066421 A1* | 3/2017 | Wei | B60T 7/22 |
| 2017/0124784 A1 | 5/2017 | Wittmann et al. | |
| 2018/0052463 A1 | 2/2018 | Mays | |
| 2018/0089911 A1* | 3/2018 | Rath | G07C 5/0808 |
| 2019/0077430 A1* | 3/2019 | Katayama | B61L 27/0005 |

FOREIGN PATENT DOCUMENTS

| | | |
|---|---|---|
| DE | 3043055 A1 | 7/1981 |
| DE | 102011086241 A1 | 5/2013 |
| EP | 1291230 A2 | 3/2003 |
| EP | 2818340 A1 | 12/2014 |
| EP | 3118072 B1 | 1/2018 |
| GB | 2539270 A | 12/2016 |
| KR | 20050009022 A | 1/2005 |
| WO | 0160644 A1 | 8/2001 |

\* cited by examiner

METHOD FOR EMERGENCY RESPONSE TO A TRANSPORTATION VEHICLE TIRE PRESSURE LOSS AND TRANSPORTATION VEHICLE

PRIORITY CLAIM

This patent application claims priority to German Patent Application No. 10 2018 216 257.3, filed 24 Sep. 2018, the disclosure of which is incorporated herein by reference in its entirety.

SUMMARY

Illustrative embodiments relate to a method for an emergency response in the event of a loss of tire pressure in a transportation vehicle, as well as a transportation vehicle, in particular, for autonomous driving.

BRIEF DESCRIPTION OF THE DRAWINGS

Disclosed embodiments are shown schematically in the figures. All features resulting from the claims, description or drawings, including construction details, spatial arrangements and the method operations, may be essential to the disclosure on their own and in different combinations. It should be noted that the figures are only descriptive and are not intended to restrict the disclosed embodiments in any way. In the figures:

DETAILED DESCRIPTION

When a tire of a transportation vehicle suffers a loss of pressure, this can lead to critical situations, especially at high speeds. For example, a loss of tire pressure can affect the steering of the transportation vehicle and thus make it difficult for the driver to control the transportation vehicle. Thus, the driver must often counter steer to keep the transportation vehicle under control and decide whether the tire damage is so great that it is not possible to continue driving. In this case, it may be necessary to find a suitable place where the transportation vehicle can be removed from ongoing traffic as safely as possible. This therefore requires a high level of attention and experience from the driver to respond correctly. In the case of autonomously driving transportation vehicles it may also be problematic that the transportation vehicle must respond to such a situation independently.

It is, therefore, desirable that the transportation vehicle can detect a loss of tire pressure and, if necessary, perform an emergency response. From the prior art, for example, it is known from EP 2 818 340 A1 to detect a loss of tire pressure by measuring a radius of the wheel and to conclude that there is damage to the tire if the radius is too small. The influence of the damaged tire on the chassis is used, wherein sensors are provided for distance measurement to the ground to detect the radius of the tire. Especially with different ground, however, necessary error correction can be expensive and therefore require high computing capacity. Furthermore, the chassis of the transportation vehicle can cause inaccuracies due to driving dynamic effects and thus may negatively affect the reliability of the detection of loss of tire pressure. In addition, such sensors are additional sensors of the transportation vehicle, which are specifically used for tire monitoring.

Disclosed embodiments at least partially remedy the previous drawbacks known from the prior art. In particular, disclosed embodiments reliably enable an emergency response in the event of a loss of tire pressure of a transportation vehicle in a simple and cost-effective manner and, therefore, to increase the safety of the transportation vehicle. The above is achieved by a method of emergency response and by a transportation vehicle.

Of course, features and details described in connection with the disclosed method also apply in connection with the disclosed transportation vehicle and vice versa in each case, so that with regard to the disclosure, the individual properties of the disclosed embodiments are always or can always be referred to reciprocally.

According to the disclosure, the method of emergency response in the event of a loss of tire pressure of a transportation vehicle includes the following:

Detecting a tire pressure on a wheel of the transportation vehicle,

Detecting an angle of inclination on an axle of the transportation vehicle associated with the wheel, Detecting an emergency situation depending on a correlation of tire pressure and angle of inclination, Determining an emergency braking maneuver of the transportation vehicle depending on the emergency situation.

The tire pressure can mean the air pressure of a tire mounted on a wheel. Furthermore, the detection of the tire pressure may be carried out by a tire pressure sensor and the detection of the angle of inclination is carried out by an inclination sensor. The tire pressure sensor can be designed for direct or indirect measurement of tire pressure. For direct measurement of the tire pressure, the tire pressure sensor may be disposed, for example, on the wheel and may comprise an air pressure sensor, in particular, a piezo sensor or the like. For indirect measurement of the tire pressure, the tire pressure sensor can be, for example, part of a sensor system and can determine the tire pressure mathematically from vibration frequencies, acceleration signals, wheel speeds and/or the like.

To detect the angle of inclination on the axle it may be provided that an inclination sensor for measuring the angle of inclination is directly disposed on the axle and/or a wheel suspension of the transportation vehicle. In particular, the angle of inclination can thus be understood to be the inclination of the axle of the transportation vehicle. The axle can be a continuous axle or may have an axle journal on which the wheel is mounted. The axle associated with the wheel can be understood to be an axle on which the wheel is mounted and/or around which the wheel rotates. The detected tire pressure can be verified by detecting the angle of inclination on the axle. Furthermore, the angle of inclination provides information about the control behavior of the transportation vehicle, in particular, the control behavior deviating due to tire damage, so that the control behavior can be anticipated computationally when determining the emergency braking maneuver. The emergency situation may include tire damage caused by the tire bursting or losing significant air. In particular, the emergency situation is therefore detected when the correlation of the tire pressure and the angle of inclination is critical, i.e., for example, if the tire pressure falls below a critical tire pressure and at the same time the angle of inclination exceeds a critical angle of inclination.

Optionally, a critical angle of inclination may be detected at an angle of inclination of greater than or equal to 10°. The correlation can therefore be understood as a relationship between the tire pressure and the angle of inclination, wherein both parameters are taken into account when detecting the emergency situation. Determining the emergency braking maneuver may include a calculation of an optimized braking time, a braking point and/or braking force. As a result, the transportation vehicle can be brought to a safe stop depending on the emergency situation and any other parameters. In particular, the emergency response may therefore include the recognition of the emergency situation and the provision of information to deal with the emergency situation.

It is also conceivable that when determining the emergency braking maneuver, a braking force is determined for the individual wheels of the transportation vehicle. Depending on the determination of the emergency braking maneuver, for example, a driving assistance system, such as a driving dynamics control system, in particular, an electronic stability program, can be controlled. The emergency braking maneuver can therefore bring the transportation vehicle to a safe stop. Thus, the safety of the transportation vehicle may be increased by a disclosed method, in that the driver has information about the current emergency situation and/or a possible control response and/or, in that a driving assistance system can be controlled depending on the emergency situation. By using wheel-related parameters, i.e., by using the correlation of the tire pressure and the angle of inclination on the axle, high reliability in detecting the emergency situation can be achieved.

Furthermore, it is provided that to detect the angle of inclination on the axle a displacement of an eccentric element is monitored. The inclination of the axle can thus indicate the position of the wheel and can thus constitute an indicator of tire damage with high accuracy. Optionally, the angle of inclination on an axle side can be compared with an angle of inclination on the opposite axle side of the transportation vehicle to determine whether there is tire damage on one side. The eccentric element may be embodied by the axle or a measuring sleeve, for example. If the eccentric element is deflected because the position of the wheel relative to the transportation vehicle body changes, the adjustment can be measured and the angle of inclination can be concluded. It is also conceivable that the detection of the angle of inclination of the transportation vehicle is carried out by a capacitive and/or inductive measurement. Non-contact sensors offer the benefit that a relative movement of two sensor parts can be designed without bearings, so that there is high accuracy with little or no wear.

Optionally, with a disclosed method, the method may further comprise validating the detection of the emergency situation, in particular, wherein the tire pressure and/or the angle of inclination is/are recorded over a predefined period of time.

Validating the detection of the emergency situation may include, for example, a comparison of the detected tire pressure at which an emergency situation was initially detected with a further tire pressure of another wheel of the transportation vehicle. Furthermore, the validation of the detection of the emergency situation can be done by detecting the tire pressure and/or the angle of inclination over a predefined period of time. This allows suspect readings that are only dependent on the current driving situation and are therefore only temporary and give no indication of the transportation vehicle having actual tire damage, to be excluded. The predefined period of time can be determined depending on the provisionally detected emergency situation or, in particular, can be specified at the factory. The recording over the predefined period can be understood as a continuous or discontinuous recording.

It is, thus, conceivable that a further measurement value will only be collected at the end of the predefined period to determine whether a critical situation still exists. However, the tire pressure and/or the angle of inclination can also be recorded as a measurement curve over the predefined period of time. Thus, validation represents another safety operation, so that errors due to incorrect measurements or special driving situations can be reduced or excluded. In particular, therefore, only the tire pressure and the angle of inclination can be used to detect the emergency situation, while further measurement data are used for validation. The recognition of the emergency situation can therefore be provisional and may be revoked by validation. As a result, the computational effort can initially be kept low and may only be increased with validation if there is actually evidence of the existence of a loss of tire pressure.

Furthermore, with a disclosed method it may be provided that the method comprises monitoring a transportation vehicle environment by an environment sensor, wherein the transportation vehicle environment is taken into account when determining the emergency braking maneuver of the transportation vehicle. Monitoring of the transportation vehicle environment may include the identification of other road users. For example, if it is detected that a road user is driving close to the transportation vehicle, the emergency braking maneuver may first provide for the setting of a warning signal over a defined period of time before the transportation vehicle is braked.

Furthermore, obstacles or the like can be detected in the transportation vehicle environment and can thus be taken into account when determining the emergency braking maneuver. In particular, in the case of an autonomous transportation vehicle, the emergency braking maneuver may include route and/or braking distance planning of the transportation vehicle, providing for evasion and/or full braking. The environment sensors may include an optical sensor, such as a camera, a radar sensor, an ultrasonic sensor and/or a lidar sensor. The environment sensor may be designed to record the transportation vehicle environment over 360° around the transportation vehicle. This ensures reliable monitoring of the transportation vehicle environment and thus increases the safety of the transportation vehicle during emergency braking. In addition, a minimum distance to another road user may be provided for when determining the emergency braking maneuver. For this purpose, the environment sensors can include a distance monitoring system.

Furthermore, it is conceivable that with a disclosed method the method comprises identifying an emergency stop position by the environment sensors and/or position detection unit of the transportation vehicle, in particular, where determining the emergency braking maneuver includes the determination of a transportation vehicle's approach to the emergency stop position. The emergency stop position may include, for example, a car park, a convenient parking space at the roadside or an emergency stopping bay. Determining the approach to the emergency stop position may include route planning, which, depending on the emergency situation, provides as safe a path as possible, in particular, taking into account transportation vehicle behavior influenced by the emergency situation. The previously determined approach can be displayed to a driver of the transportation vehicle by a navigation device and/or a head-up display. This can be used to assist the driver in the event of an emergency situation by showing the driver the proposal for approaching the emergency stop position.

In the case of an autonomous transportation vehicle, the approach to the emergency stop position can be used to perform an automatic driving maneuver, in particular, the emergency braking maneuver. For example, the position detection unit may have a GPS receiver to detect the position of the transportation vehicle and to compare the position with data regarding emergency stop positions. In particular, the nearest emergency stop position can be located via the position detection unit and can be detected by the environment sensors, e.g., can be recognized from the dimensions during the approach.

In the context of the disclosure, it may also be provided that the method includes detecting slipping of the wheel, wherein the slip is taken into account when determining the emergency braking maneuver. The slip can indicate a level of wheel grip, so that the driving behavior of the wheel can be detected. In addition, an electronic stability program can be controlled in accordance with the slip. For example, it is conceivable that in the event of tire damage to the left front wheel of the transportation vehicle, the right front wheel is controlled accordingly, i.e., braked, to maintain the driving stability of the transportation vehicle. Furthermore, the slip can be used to validate the detection of the emergency situation. Thus, a completely destroyed tire can have a characteristic grip level, which can be used to verify the correlation of the angle of inclination and the tire pressure.

It is also conceivable that the method will include issuing instructions to a driver of the transportation vehicle to perform the emergency braking maneuver, via a display unit.

The display unit may include a head-up display and/or a navigation system of the transportation vehicle. Thus, it is conceivable that the instructions include parts of the emergency braking maneuver or the entire emergency braking maneuver. For example, in the case of an autonomous transportation vehicle, the driver can be given a signal that he should intervene in the control of the transportation vehicle. The driver can then be guided by the instructions to perform the emergency braking maneuver. The emergency response may therefore include, for example, that the emergency braking maneuver is at least partially proposed or prescribed to the driver, so that he is supported in the assessment and/or handling of the emergency situation regardless of his driving experience.

It is further conceivable in a disclosed method that the transportation vehicle is designed for autonomous driving, wherein the method includes automatically performing the emergency braking maneuver.

A transportation vehicle for autonomous driving can be understood to be a transportation vehicle that is designed for independent driving, i.e., in particular, without the intervention of a driver. Optionally, the transportation vehicle comprises at least one driving assistance system, which can detect a transportation vehicle environment by the environment sensors and can perform corresponding necessary driving maneuvers. Due to the automatic execution of the emergency braking maneuver, an intervention of a driver is not necessary in this situation. The transportation vehicle can independently detect and control an emergency stop position and/or can stop the transportation vehicle in case of high instability of the driving behavior due to the emergency situation.

In the context of the disclosure, it may also be provided that the method comprises at least one of issuing a visual warning signal to road users, or sending an emergency signal to road users and/or to a central control center. For example, road users can mean other transportation vehicles, pedestrians, cyclists or the like. The visual warning signal can include setting a flasher or switching on a flashing warning system. This allows road users to be informed or warned about the emergency situation, especially before the emergency braking maneuver is carried out. Sending the emergency signal may include the transmission of a radio signal to the road users and/or to the central control center. The radio signal can include a wi-fi signal, a cellular signal and/or the like.

It is, thus, conceivable that road users, in particular, if the transportation vehicle and/or the road users are autonomous transportation vehicles, will be informed of the emergency situation by the emergency signal. In particular, detailed information about the emergency situation, such as the location of the tire damage, the emergency braking maneuver and/or the expected driving behavior of the transportation vehicle, can also be sent. This allows road users to anticipate the behavior of the transportation vehicle and, if necessary, to respond to it. By sending the emergency signal to a central control center, the control center can be informed about the emergency situation and can initiate assistance measures if necessary, such as sending an accident assistance transportation vehicle or the like. In addition, traffic control can be improved by the central control center, e.g., by early diversions, so that a traffic jam that may be expected due to the tire damage can be reduced.

The described operations of the method can be carried out in the described order or in a different order. In particular, individual or all operations of the method may be repeated.

According to another disclosed embodiment, a transportation vehicle, in particular, for autonomous driving, is provided. In this case, the transportation vehicle comprises a tire pressure sensor for detecting a tire pressure on a wheel of the transportation vehicle and an inclination sensor for detecting an angle of inclination on an axle of the transportation vehicle that is associated with the wheel. Furthermore, the transportation vehicle comprises a control unit that is designed for carrying out a disclosed method.

Thus, a disclosed transportation vehicle brings with it the same benefits as have been described in detail with reference to a disclosed method. In particular, the transportation vehicle may be designed for fully autonomous driving of routes or for the automatic execution of individual maneuvers. The control unit can be a central control unit. However, it is also conceivable that the control unit is distributed and includes, in particular, multiple ECUs. Furthermore, the control unit may have a processor and/or an embedded system for carrying out the method. By carrying out the disclosed method, in particular, already at least partially existing sensors of a transportation vehicle can be used to perform an emergency response. This can increase the safety of the transportation vehicle in a cost-effective and simple manner. A retrofit of the transportation vehicle or the control unit can also be enabled.

In the following figures, the same reference characters are also used for the same technical characteristics of different exemplary embodiments.

Figure 1:
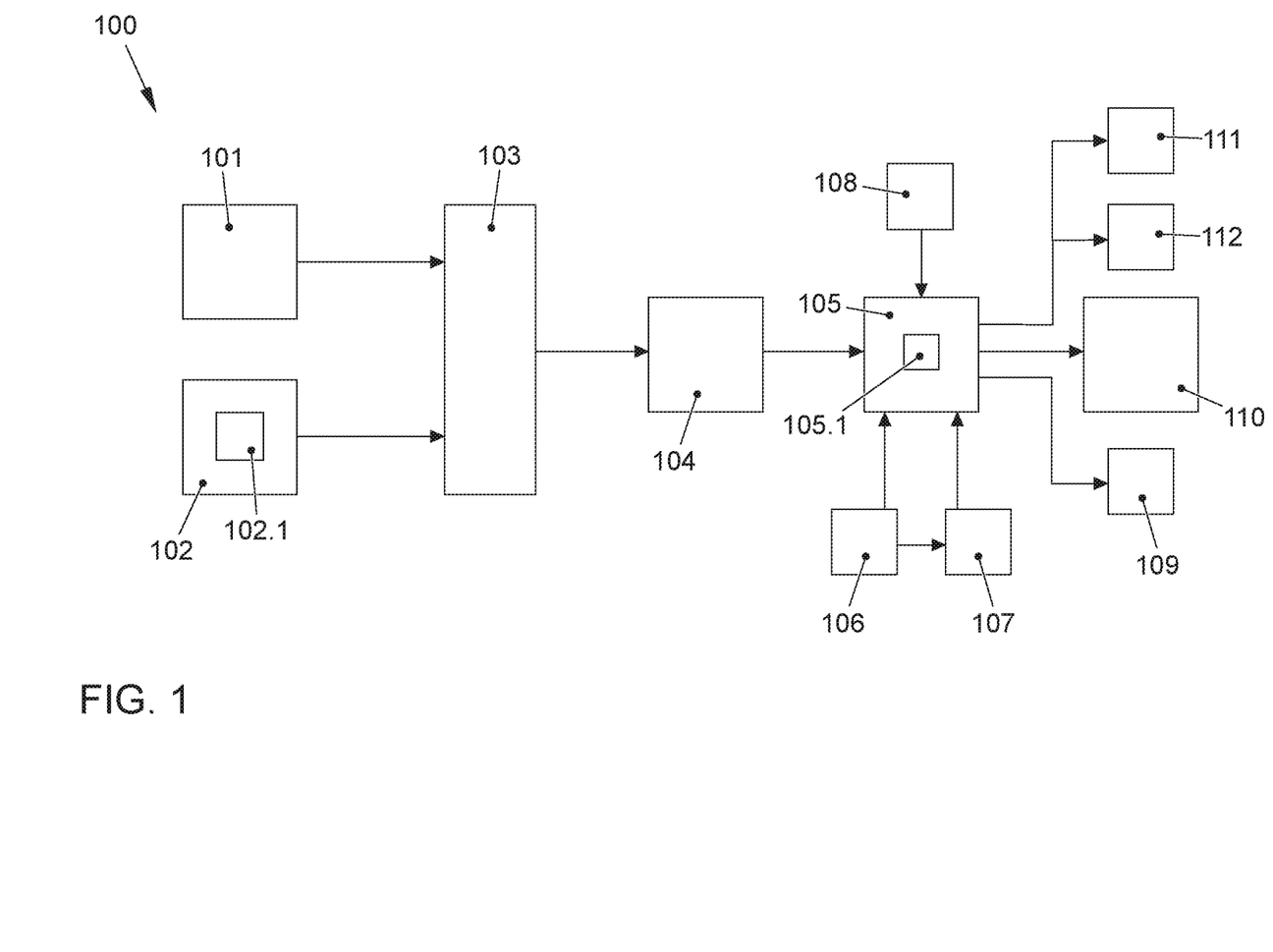
FIG. 1 shows a disclosed method in a schematic representation of method operations in a first exemplary embodiment.

FIG. 1 shows a method 100 for the emergency response in a case of a loss of tire pressure of a transportation vehicle 1 in a schematic representation of the operations of the method in a first exemplary embodiment. The transportation vehicle 1 is shown schematically in FIG. 3. The method 100 includes the detection 101 of a tire pressure 20 on a wheel 10 and the detection 102 of an angle of inclination 21 on an axle 12 of the transportation vehicle 1 associated with the wheel 10. The detection 102 of the angle of inclination 21 on the axle 12 of the transportation vehicle 1 may be carried out by a capacitive and/or inductive measurement. In particular, a displacement 102.1 of an eccentric element 13.1 can be monitored to record the angle of inclination 21 by measurement technology. A correlation of the tire pressure 20 and the angle of inclination 21 is then produced and/or detected and depending on the correlation, an emergency situation is detected 103. The emergency situation may include, for example, a change in driving behavior due to a loss of tire pressure or a slow progression of a loss of tire pressure. After recognizing 103 the emergency situation due to the tire pressure 20 and the angle of inclination 21, a validation 104 of the detection 103 is first provided. Validation 104 can increase the reliability of the method 100 by, for example, excluding the detected tire pressure 20 and the detected angle of inclination 21 being due to a single driving event, such as a pothole. In particular, the validation 104 for this may include permanent or repeated detection 101, 102 of the tire pressure 20 and the angle of inclination 21 over a predefined period.

Figure 2:
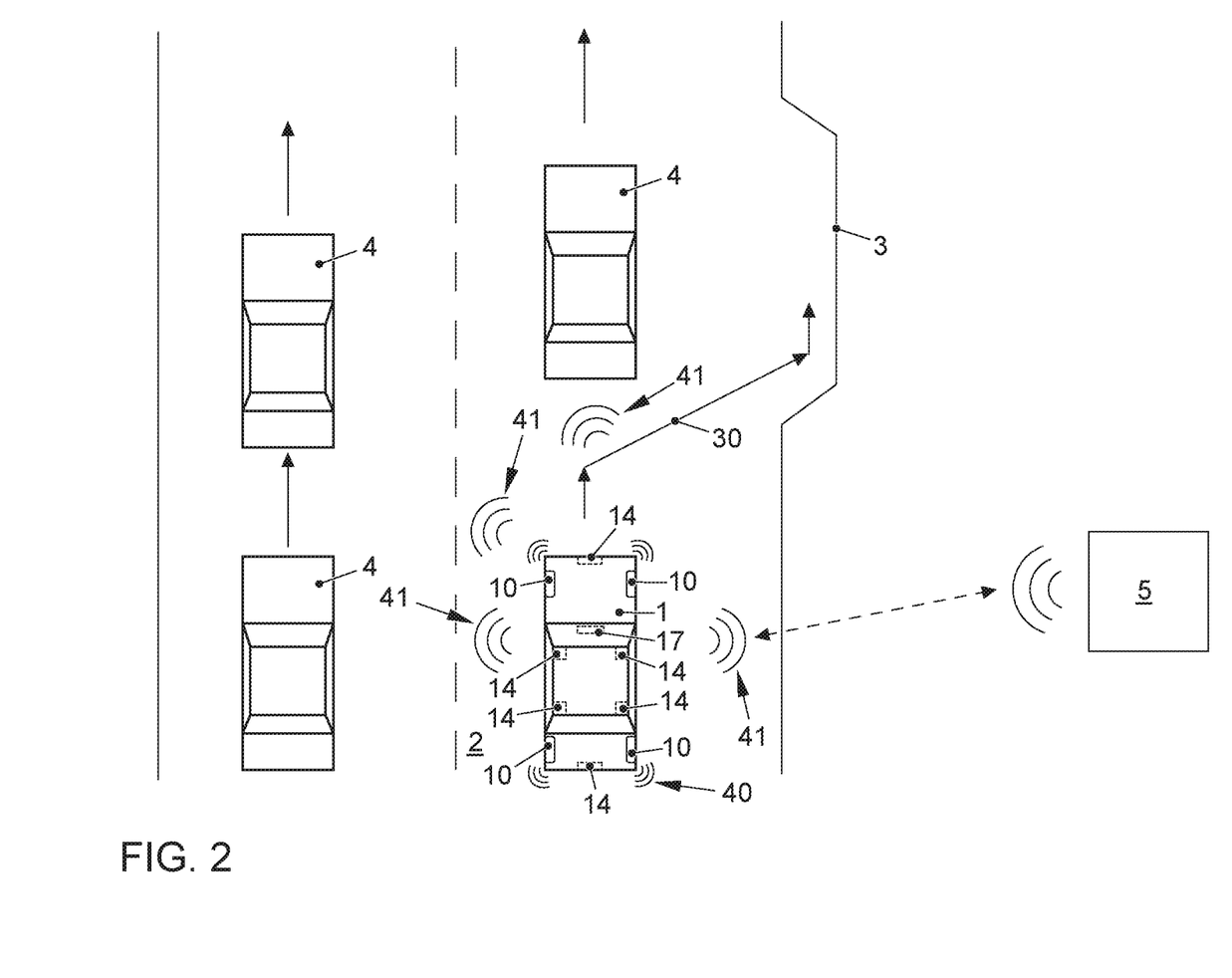
FIG. 2 shows a traffic situation using the disclosed of the first exemplary embodiment in a schematic representation.

After the validation 104, the method 100 also includes determining 105 an emergency braking maneuver 30 of the transportation vehicle depending on the emergency situation. A possible emergency braking maneuver 30 is shown in FIG. 2. Thus, it may be provided that the emergency braking maneuver 30 is calculated differently depending on the severity of the loss of tire pressure. For example, in the event of a sudden bursting of a tire 10.1 of the wheel 10, rapid braking of the transportation vehicle 1 is provided, whereas in the event of a creeping loss of tire pressure, the emergency braking maneuver 30 may be provided for a controlled approach to an emergency stop position 3. The transportation vehicle environment 2 can also be taken into account in the emergency braking maneuver 30. For this purpose, monitoring 106 of the transportation vehicle environment 2 is provided by environment sensors 14 of the transportation vehicle 1. This allows information about road users 4 and/or obstacles to be incorporated into the determination 105 of the emergency braking maneuver 30, so that the emergency braking maneuver 30 can be adapted to the traffic situation or the transportation vehicle environment 2 if necessary. In addition, for the approach to the emergency stop position 3 an identification 107 of the emergency stop position 3 is provided by the environment sensors 14 of the transportation vehicle 1. For this purpose, optically captured data from the environment sensors 14 can be compared with reference images of typical emergency stop positions 3, such as emergency bays. In addition or alternatively, it is conceivable that the transportation vehicle 1 comprises a position detection unit 18, wherein a nearest emergency stop position 3 can be determined using the position data of the transportation vehicle 1 gained by the position detection unit 18. After identifying 107 the emergency stop position 3, a determination 105.1 of an approach to the emergency stop position 3 can be carried out and integrated into the determination 105 of the emergency braking maneuver 30. FIG. 2 shows a corresponding route of the transportation vehicle 1 to the emergency stop position 3 for this.

Furthermore, when determining 105 the emergency braking maneuver 30, wheel 10 slip or tire 10.1 slip may be taken into account. For this purpose, in particular, recording of 108 the wheel 10 slip can be carried out. The slip can, for example, be detected by an electronic stability program. In this way, the slip allows the level of grip of the tire 10.1 to be concluded, which in turn has an influence on the driving behavior of the transportation vehicle 1. If the slip is therefore taken into account when determining 105 the emergency braking maneuver 30, the driving behavior of the transportation vehicle 1, when there is a loss of tire pressure, can be better predicted and responded to. Optionally, instructions to perform the emergency braking maneuver 30 can be issued 109 to a driver of the transportation vehicle 1 via a display unit 17, such as a head-up display and/or a navigation system, to guide the driver in the emergency situation. If the transportation vehicle 1 is an autonomously driving transportation vehicle or an at least partially autonomously driving transportation vehicle 1, automatic performance 110 of the emergency braking maneuver 30 can be provided.

Therefore, it is not necessary for a driver to intervene to perform the emergency braking maneuver 30, but the emergency braking maneuver 30 can also be carried out independently by the transportation vehicle 1. For this purpose, it is beneficial that a variety of measurement data can be provided by a method 100. To enable other road users 4 to adjust their driving behavior to the emergency situation of the transportation vehicle 1, they can be warned. In doing so, the issue of a visual warning signal 40 and/or the transmission 112 of an emergency signal 41 to road users 4 is/are provided. This allows road users 4 to be informed that an emergency situation exists, whereby further information, such as the planned emergency braking maneuver 30 or the like, can be sent by the emergency signal 41, which includes a radio signal. Furthermore, communication with a central control center 5 may be provided, which may divert traffic by information about the emergency situation of the transportation vehicle 1 or may initiate assistance measures, such as sending an accident assistance transportation vehicle.

Figure 3:
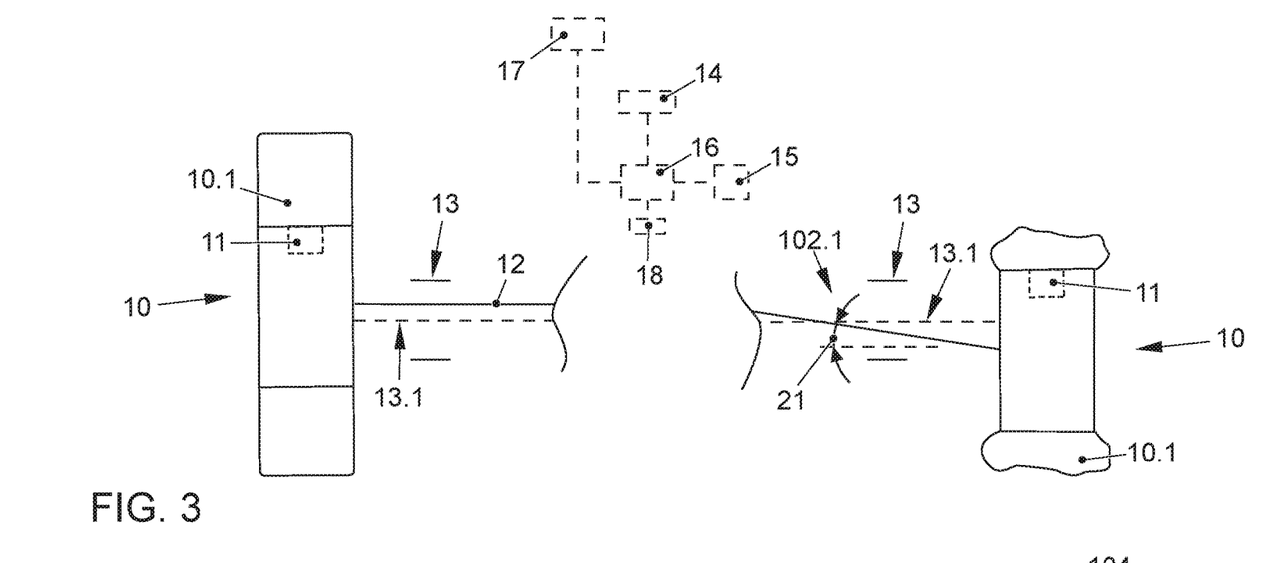
FIG. 3 shows a transportation vehicle in a schematic representation according to the first exemplary embodiment.

FIG. 3 shows a schematic section of the transportation vehicle 1 in a schematic view. The transportation vehicle 1 comprises a control unit 16, which is designed for carrying out the method 100 for the emergency response in the event of a loss of tire pressure according to the first exemplary embodiment. The control unit 16 may have a central control unit of the transportation vehicle 1 and/or one or more distributed control units. Furthermore, the control unit 16 has a communication connection to an electronic stability controller 15, so that, for example, tire 10.1 slip may be taken into account in the emergency braking maneuver 30 and/or control of the electronic stability control function 15 may be carried out in relation to the provision 105 of the emergency braking maneuver 30. As shown, the front left tire 10.1 of the transportation vehicle 1 shows tire damage, while the opposite, front right tire 10.1 is still intact. Accordingly, the axle positions of the wheels 10 associated with the tires 10.1 are different.

Thus, the axle 12 on the wheel 10 of the damaged tire 10.1 has an angle of inclination 21 relative to the horizontal or to the opposite side on the wheel 10 of the undamaged tire 10.1. Depending on the design of the wheel suspension or the chassis of the transportation vehicle 1, the inclination may also be on both sides, so that the angle of inclination 21 is continuously present between the opposite wheels 10. The angle of inclination 21 on the axle 12 can be detected by at least one inclination sensor 13 that includes an eccentric element 13.1. Thus, if the axle 12 tilts at least on one-side, the eccentric element 13.1 is displaced, wherein the displacement 102.1 may be detected capacitively or inductively.

In particular, the angle of inclination 21 can be detected not only in one plane, but also spatially, since here the eccentric element 13.1 can provide the space for displacement 102.1 in several directions. For detecting 101 the tire pressure 20 of the respective tires 10.1, further tire pressure sensors 11 are provided, each of which is attached to the wheels 10. In addition or alternatively, the tire pressure 20 can be detected by the control unit 16, wherein the tire pressure 20 is determined indirectly via further measurement data, such as wheel vibrations. In particular, for monitoring 106 the transportation vehicle environment 2 and/or for identification 107 of the emergency stop position 3, the control unit 16 also has a communication connection to the environment sensors 14 and/or to the position detection unit 18.

Figure 4:
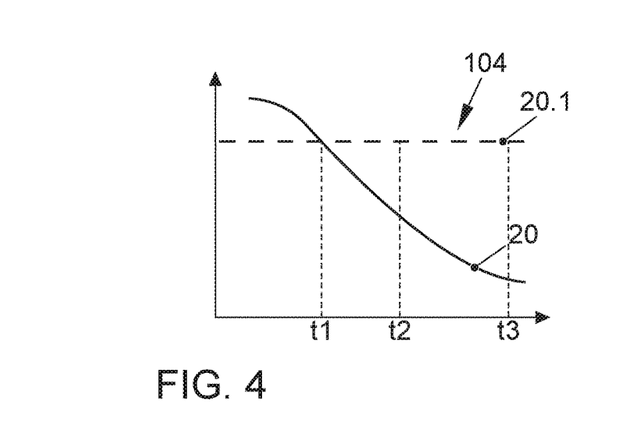
FIG. 4 shows the disclosed embodiment with time of a tire pressure of a transportation vehicle for a case of loss of tire pressure in a schematic representation in a second exemplary embodiment.
Figure 5:
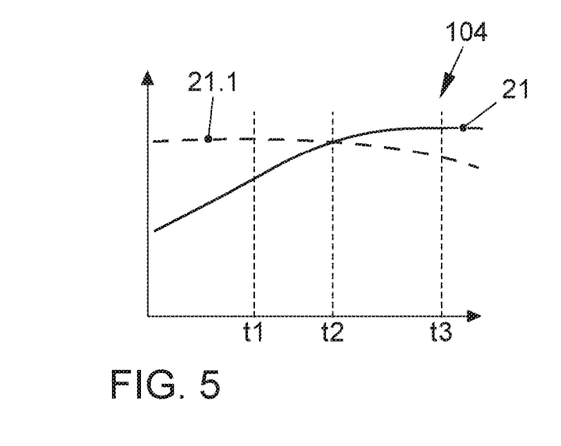
FIG. 5 shows a variation with time of an angle of inclination of the transportation vehicle for a case of a loss of tire pressure in a schematic representation according to the second exemplary embodiment.

FIG. 4 also shows schematically a time variation of a tire pressure 20 and FIG. 5 shows schematically a time variation of an angle of inclination 21 on an axle 12 of a transportation vehicle 1. At a first time t1, the tire pressure 20 falls below a critical tire pressure 20.1, which thus forms a limit value. At a second time t2, the angle of inclination 21 exceeds a critical angle of inclination 21.1, which also forms a limit value. In particular, the second time t2 is after the first time t1, when the tire pressure 20 slowly drops and subsequently an axle 12 of the transportation vehicle 1 is lowered. The second time t2 can also be almost identical to the first time t1, e.g., when the tire 10.1 suddenly bursts. Thus, the angle of inclination 21 and the tire pressure 20 have a correlation, i.e., for example, a temporal relationship. Thus, both critical readings 20.1, 21.1 are available simultaneously, at least at the second time t2. In the present case, reaching the critical angle of inclination 21.1 follows reaching the critical tire pressure 20.1 after a short time. Thus, the existence of an emergency situation due to a loss of tire pressure of the transportation vehicle 1 can be concluded. In addition, a validation 104 can be performed to exclude this being a temporary effect, e.g., due to a pothole. For this purpose, the tire pressure 20 and the angle of inclination 21 are recorded up to a third time t3 and the emergency situation is verified if at least the tire pressure 20 and/or the angle of inclination 21 do not leave the critical region again.

The foregoing explanation of the embodiments describes the present disclosure exclusively in the context of examples. Of course, individual features of the embodiments can be freely combined with each other without departing from the scope of the present disclosure, provided this is technically reasonable.

REFERENCE CHARACTER LIST 1 transportation vehicle
2 transportation vehicle environment
3 emergency stop position
4 road user
5 control center
10 wheel
10.1 tires
11 tire pressure sensor
12 axle
13 inclination sensor
13.1 eccentric element
14 environment sensors
15 electronic stability control
16 control unit
17 display unit
18 position detection unit
20 tire pressure
20.1 critical tire pressure value
21.1 critical angle of inclination
21 angle of inclination
30 emergency braking maneuvers
40 visual warning signal
41 emergency signal
100 method
101 detecting 20
102 detecting 21
102.1 adjustment of 13.1
103 recognizing an emergency situation
104 validation
105 determining 30
106 monitoring 2
107 identifying 3
108 detecting slip
109 issuing instructions
110 automatic execution of 30
111 transmitting 40
112 transmitting 41
t1-t3 times

The invention claimed is:

1. A transportation vehicle comprising:
a tire pressure sensor configured to detect a tire pressure of a wheel of the transportation vehicle;
an inclination sensor configured to detect an angle of inclination on an axle of the transportation vehicle associated with the wheel; and
a control unit configured to perform a method for an emergency response to a loss of tire pressure of the transportation vehicle that includes detecting tire pressure of a wheel of the transportation vehicle, detecting an angle of inclination of the axle of the transportation vehicle associated with the wheel, detecting an emergency situation based on a correlation of the tire pressure and the angle of inclination of the axle, and determining an emergency braking maneuver of the transportation vehicle to be performed automatically by the transportation vehicle based on the emergency situation,
wherein the transportation vehicle is designed for autonomous driving, the control unit further configured to automatically perform the emergency braking maneuver, and
wherein the correlation comprises the angle of inclination exceeds a predefined angle and the tire pressure is below a predefined tire pressure.

2. The transportation vehicle of claim 1, wherein a displacement of an eccentric element is monitored to detect the angle in inclination on the axle.

3. The transportation vehicle of claim 1, wherein the detection of the emergency situation is validated.

4. The transportation vehicle of claim 1, wherein a transportation vehicle environment is monitored by an environment sensor, wherein the transportation vehicle environment is taken into account when determining the emergency braking maneuver of the transportation vehicle.

5. The transportation vehicle of claim 1, wherein an emergency stop position is identified by environment sensors and/or a position detection unit of the transportation vehicle.

6. The transportation vehicle of claim 1, wherein slipping of the wheel is detected and the slip is taken into account when determining the emergency braking maneuver.

7. The transportation vehicle of claim 1, wherein instructions are issued to a driver of the transportation vehicle to perform the emergency braking maneuver via a display unit.

8. The transportation vehicle of claim 1, wherein the control unit is further configured to:
   issue a visual warning signal to road users, and
   send an emergency signal to road users and/or to a central control center.

9. A method for an emergency response to a loss of tire pressure of a transportation vehicle, the method comprising:
   detecting tire pressure of a wheel of the transportation vehicle;
   detecting an angle of inclination of an axle of the transportation vehicle associated with the wheel;
   detecting an emergency situation based on a correlation of the tire pressure and the angle of inclination of the axle; and
   determining an emergency braking maneuver of the transportation vehicle to be automatically performed by the transportation vehicle based on the emergency situation,
   wherein the transportation vehicle is designed for autonomous driving, the method further comprising automatically performing the emergency braking maneuver, and wherein the correlation comprises the angle of inclination exceeds a predefined angle and the tire pressure is below a predefined tire pressure.

10. The method of claim 9, wherein a displacement of an eccentric element is monitored to detect the angle in inclination on the axle.

11. The method of claim 9, further comprising validating the detection of the emergency situation.

12. The method of claim 9, further comprising monitoring a transportation vehicle environment by an environment sensor, wherein the transportation vehicle environment is taken into account when determining the emergency braking maneuver of the transportation vehicle.

13. The method of claim 9, further comprising identifying an emergency stop position by environment sensors and/or a position detection unit of the transportation vehicle.

14. The method of claim 9, further comprising detecting slipping of the wheel, wherein the slip is taken into account when determining the emergency braking maneuver.

15. The method of claim 9, further comprising issuing instructions to a driver of the transportation vehicle to perform the emergency braking maneuver via a display unit.

16. The method of claim 9, wherein the method includes at least one of the following:
   issuing a visual warning signal to road users, and
   sending an emergency signal to road users and/or to a central control center.

* * * * *